US012784498B2

(12) United States Patent
Stochel et al.

(10) Patent No.: US 12,784,498 B2
(45) Date of Patent: Nov. 3, 2026

(54) SYSTEM AND METHOD FOR LEVERAGING DOWNLINK BANDWIDTH WHEN UPLINK BANDWIDTH IS LIMITED

(71) Applicant: MOTOROLA SOLUTIONS, INC., Chicago, IL (US)

(72) Inventors: Marek Stochel, Gaj (PL); Rafal Faber, Przeginia Duchowna (PL); Jakub Wojzniczka, Cracow (PL); Jakub Plonka, Cracow (PL); Ivan Kostiuk, Cracow (PL); Przemyslaw Kobylanski, Wielkopolski (PL); Stanislaw Lagodzic, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 320 days.

(21) Appl. No.: 18/040,435

(22) PCT Filed: Dec. 16, 2020

(86) PCT No.: PCT/PL2020/050095

§ 371 (c)(1),
(2) Date: Feb. 3, 2023

(87) PCT Pub. No.: WO2022/131942

PCT Pub. Date: Jun. 23, 2022

(65) Prior Publication Data

US 2023/0306784 A1 Sep. 28, 2023

(51) Int. Cl.
*G06V 40/16* (2022.01)
*G06T 3/40* (2024.01)
*H04N 23/80* (2023.01)

(52) U.S. Cl.
CPC .............. *G06V 40/172* (2022.01); *G06T 3/40* (2013.01); *H04N 23/80* (2023.01)

(58) Field of Classification Search
None
See application file for complete search history.

(56) References Cited

U.S. PATENT DOCUMENTS

| | | | |
|---|---|---|---|
| 5,781,650 | A | 7/1998 | Lobo et al. |
| 7,804,982 | B2 | 9/2010 | Howard et al. |

(Continued)

FOREIGN PATENT DOCUMENTS

| | | | |
|---|---|---|---|
| EP | 2650822 | A1 | 10/2013 |

OTHER PUBLICATIONS

The International Search Report and the Written Opinion, corresponding patent application No. PCT/PL2020/050095 filed Dec. 16, 2020, all pages.

*Primary Examiner* — Randolph I Chu

(57) ABSTRACT

Techniques for leveraging downlink bandwidth when uplink bandwidth is limited are provided. An image is captured at an edged device, the image including at least one face of a person, the image captured at a first resolution. The image is stored at the first resolution in the edge device. The image is converted to a second resolution, the second resolution being lower than the first resolution. The converted image is sent to a backend facial recognition system. A set of candidate facial recognition matches is received. Facial recognition is performed at the edge device based on the stored image captured at the first resolution and the set of candidate facial recognition matches.

20 Claims, 5 Drawing Sheets

(56) References Cited

U.S. PATENT DOCUMENTS

| | | | | |
|---|---|---|---|---|
| 8,861,801 | B2 * | 10/2014 | Sukegawa | G06V 40/172<br>382/209 |
| 9,471,838 | B2 | 10/2016 | Miller et al. | |
| 9,691,132 | B2 * | 6/2017 | Kim | G06F 16/583 |
| 9,811,716 | B2 * | 11/2017 | Kim | G06V 40/161 |
| 10,467,490 | B2 * | 11/2019 | He | G06F 21/32 |
| 10,706,308 | B2 * | 7/2020 | Zaman | G05D 1/0246 |
| 12,273,255 | B1 * | 4/2025 | Bhatnagar | H04L 43/55 |
| 2006/0020630 | A1 | 1/2006 | Stager et al. | |
| 2010/0239130 | A1 * | 9/2010 | Chen | G06V 10/95<br>382/118 |
| 2011/0243407 | A1 | 10/2011 | Sofka et al. | |
| 2015/0120933 | A1 * | 4/2015 | Yates | H04L 47/70<br>709/226 |
| 2017/0076168 | A1 * | 3/2017 | Vrabete | G06V 30/242 |
| 2017/0201689 | A1 * | 7/2017 | Zilberman | H04N 21/4223 |
| 2019/0325199 | A1 | 10/2019 | Wang et al. | |
| 2020/0005319 | A1 | 1/2020 | Scarborough et al. | |
| 2020/0010511 | A1 | 1/2020 | Jayasinghe et al. | |
| 2020/0105111 | A1 * | 4/2020 | Messer | G08B 13/19656 |
| 2020/0105400 | A1 * | 4/2020 | Alvelda, VII | G06V 40/172 |
| 2022/0300753 | A1 * | 9/2022 | Bapat | G06F 18/23 |
| 2023/0306784 | A1 * | 9/2023 | Stochel | G06V 40/172 |
| 2024/0244217 | A1 * | 7/2024 | Day | G06V 10/44 |

* cited by examiner

SYSTEM AND METHOD FOR LEVERAGING DOWNLINK BANDWIDTH WHEN UPLINK BANDWIDTH IS LIMITED

BACKGROUND

The presence of cameras, in particular video cameras that capture full motion video, has become ubiquitous in today's world. There are fixed surveillance cameras, dashboard cameras (in both civilian and law enforcement use), personal cameras (e.g. police body worn cameras (BWC), civilian smartphone cameras, etc.), drone cameras, and many other types of cameras. All of these cameras generate data that may be analyzed using various analytics systems to detect objects of interest.

One particular use case for video analytics is to perform facial recognition. A video clip of a scene may be captured and analyzed via a facial recognition system to identify any people contained within the scene. For example, a surveillance camera may provide video on which facial recognition is performed to determine if a vulnerable person has been detected (e.g. elderly person who has wandered away from a care facility, lost child, etc.). The facial recognition system may also be used to identify persons wanted for other reasons (e.g. criminals, etc.).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
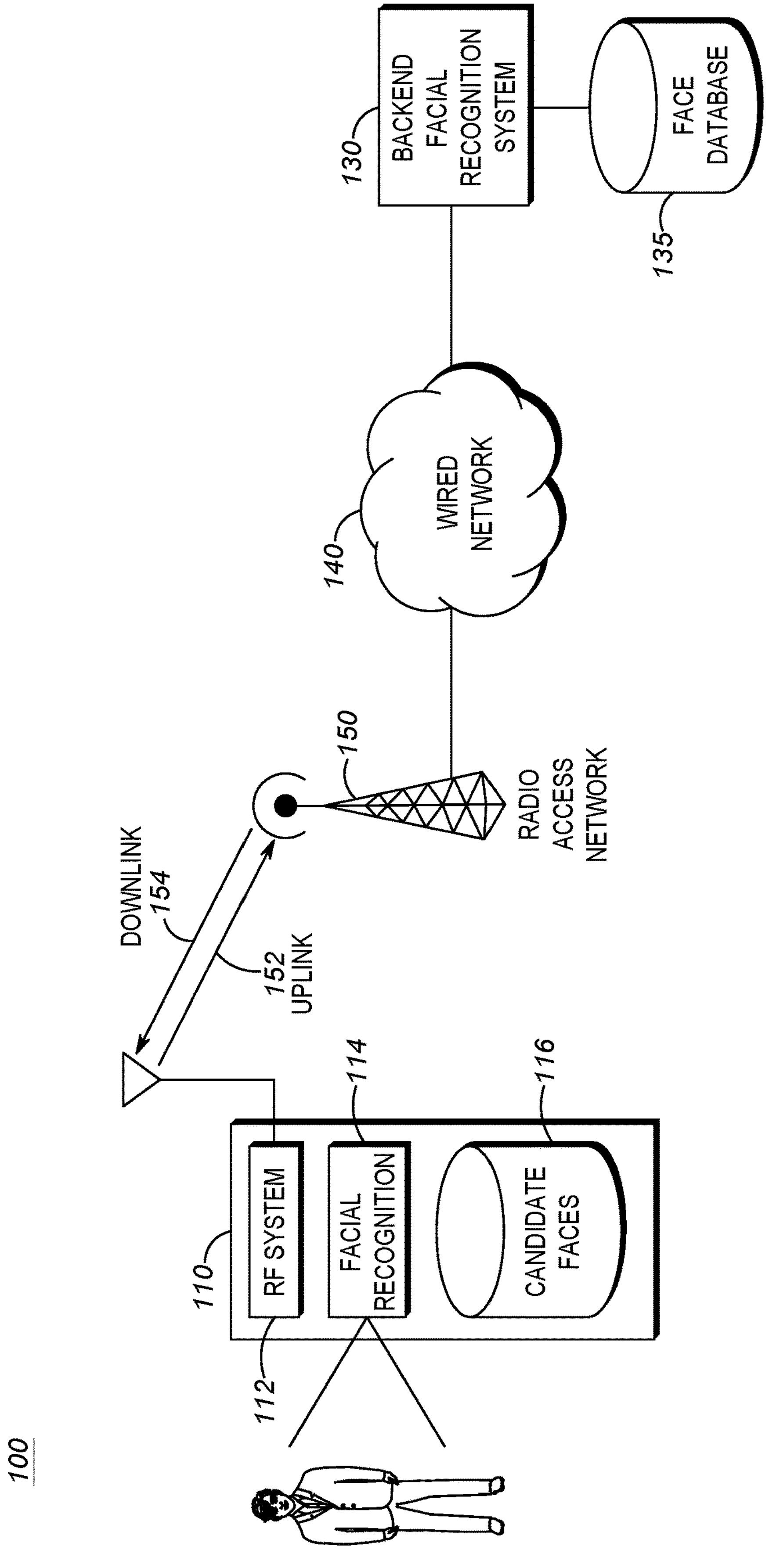
FIG. 1 is an example environment in which downlink bandwidth may be leveraged when uplink bandwidth is limited may be utilized.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

There are two general classes of architectures for facial recognition systems. The first type may be referred to as an infrastructure based facial recognition system. A video source (e.g. BWC, etc.), which may also be referred to as an edge device, may stream video over a wired or wireless network to a backend facial recognition system that may include powerful servers and large databases of faces/facial templates. The backend system may service several edge devices. The backend system may receive the video, perform facial recognition (or other analytics) on the video and send the result (e.g. person identified) back to the edge device.

Generally speaking, the higher the resolution of the video (e.g. higher quality) sent from the edge device to the backend system, the better the likelihood that the backend system will be able to positively identify a specific individual with a high degree of confidence. The downside to sending higher resolution images is that more bandwidth is required. As will be described further below, in a wireless system, bandwidth may be limited and is limited in an asymmetric way.

The second general class of facial recognition systems involves the edge device capturing an image and performing facial recognition locally. Although performing facial recognition locally removes the concerns related to bandwidth, other problems arise. For example, databases that store face images/face templates may be very large, with sizes that vastly exceed the storage capacity of portable edge devices (e.g. body worn cameras, smartphones, etc.). Furthermore, performing facial recognition across such a large database may require computer processing power that is just not available in a typical edge device. In addition, edge device may be powered by batteries. The amount of energy necessary to perform facial recognition across large databases could cause unacceptable battery life.

As mentioned above, edge devices are typically connected to back end systems, at least in part, through a wireless network. For example, a police body worn camera may connect to a Long Term Evolution (LTE) network wirelessly. The LTE network may provide access to additional wired/wireless networks (e.g. intranets, the Internet, etc.). A backend facial recognition system may be connected directly to the LTE network or to one of the additional wired/wireless networks, allowing the edge device to communicate with the backend facial recognition system.

Wireless networks will generally have two classes of connections to each edge device. There will be an uplink channel over which data is sent from the edge device to the wireless network and a downlink channel over which data is sent from the network to the wireless device. These channels will be referred to generically as the uplink and downlink. It is understood that different wireless technologies may make use of one or more sub-channels, but for purposes of this description the data to the edge device goes over the downlink and data from the edge device goes over the uplink. The particular channel structure of the wireless access technology is unimportant.

Uplink and downlink bandwidth is asymmetric due to the nature of the wireless access technology. Downlink bandwidth is generally greater than uplink bandwidth due to various factors (e.g. superior power control, timing control, etc.). Furthermore, uplink bandwidth is shared between multiple edge devices, which are not able to efficiently coordinate usage of the wireless spectrum. Regardless of the reason for the asymmetry, what should be understood is that downlink bandwidth is generally greater than uplink bandwidth.

A problem arises in that bandwidth may not be used efficiently when multiple edge devices are sending images or video to the backend facial recognition system over the wireless uplink. The uplink bandwidth is limited and is shared amongst the edge devices that are sending video or images. This means that it takes longer for each edge device to send the video or images to the backend facial recognition system. Given enough edge devices, it may be possible that none of the edge devices are able to send images in a usable fashion, as the available bandwidth for each edge device may be too low.

At the same time, there may be excess capacity on the downlink. As explained above, when using a backend facial recognition system, the video or images (which may be large amounts of data) are sent to the backend facial recognition system. The result (e.g. matched face, identification information for the matched face, etc.) is sent to the edge device over the downlink. The amount of data sent over the downlink is relatively small.

The techniques described herein overcome this problem by leveraging downlink bandwidth when uplink bandwidth is limited. Instead of sending high resolution images or video as captured, a lower resolution version is sent. This reduces the amount of uplink bandwidth that is needed. The selected resolution is based on the available uplink bandwidth and downlink bandwidth.

Because a lower resolution image or video is sent to the backend facial recognition system, it may not be possible to identify a single face with a high enough level of confidence to declare a match. However, it may be possible to limit the set of candidate face matches to a smaller set, based on the lower resolution images or video. This smaller set (e.g. much less than the complete database) of faces may then be sent to the edge device over the downlink, utilizing the bandwidth available on the downlink.

The edge device may then receive this limited set of candidate facial matches and perform facial recognition using the image or video at its originally captured higher resolution. Because the edge device only receives the smaller set of candidate face matches, there is no need for a massive database at the edge device. Furthermore, because the facial recognition algorithm is only being performed over this smaller set of candidate face matches, the processing power required at the edge device is greatly reduced compared to that which would have been required to perform facial recognition using the full database maintained by the backend facial recognition system. In addition, the amount of time necessary to perform the facial recognition is reduced due to the smaller set of candidate face matches.

A method is provided. An image is captured at an edge device, the image including at least one face of a person, the image captured at a first resolution. The method further includes storing the image at the first resolution in the edge device. The method also includes converting the image to a second resolution, the second resolution being lower than the first resolution. The method also includes sending the converted image to a backend facial recognition system. The method additionally includes receiving a set of candidate facial recognition matches. The method also includes performing, at the edge device, facial recognition based on the stored image captured at the first resolution and the set of candidate facial recognition matches.

In one aspect, the method further includes detecting an amount of bandwidth available on an uplink between the edge device and the backend facial recognition system and selecting the second resolution based on the available uplink bandwidth. In one aspect, the method further includes detecting an amount of bandwidth available on a downlink between the backend facial recognition system and the edge device and selecting the second resolution based on the available downlink bandwidth.

In one aspect, the method further includes detecting an amount of bandwidth available on an uplink between the edge device and the backend facial recognition system, detecting the amount of bandwidth on a downlink between the backend facial recognition system and the edge device, and selecting the second resolution based on the available uplink and downlink bandwidth. In one aspect, the image is at least one frame of a video. In one aspect, the set of candidate facial recognition matches is a set of facial templates. In one aspect, the edge device is a body worn camera that is wirelessly coupled to the backend facial recognition system.

A device is provided. The device includes a processor and a memory coupled to the processor. The memory contains a set of instructions thereon that when executed by the processor cause the processor to capture, at an edge device, an image, the image including at least one face of a person, the image captured at a first resolution. The instructions further cause the processor to store the image at the first resolution in the edge device. The instructions further cause the processor to convert the image to a second resolution, the second resolution being lower than the first resolution. The instructions further cause the processor to send the converted image to a backend facial recognition system. The instructions further cause the processor to receive a set of candidate facial recognition matches. The instructions further cause the processor to perform, at the edge device, facial recognition based on the stored image captured at the first resolution and the set of candidate facial recognition matches.

In one aspect, the instructions further cause the processor to detect an amount of bandwidth available on an uplink between the edge device and the backend facial recognition system and select the second resolution based on the available uplink bandwidth. In one aspect, the instructions further cause the processor to detect an amount of bandwidth available on a downlink between the backend facial recognition system and the edge device and select the second resolution based on the available downlink bandwidth.

In one aspect, the instructions further cause the processor to detect an amount of bandwidth available on an uplink between the edge device and the backend facial recognition system, detect the amount of bandwidth on a downlink between the backend facial recognition system and the edge device, and select the second resolution based on the available uplink and downlink bandwidth. In one aspect, the image is at least one frame of a video. In one aspect, the set of candidate facial recognition matches is a set of facial templates. In one aspect, the edge device is a body worn camera that is wirelessly coupled to the backend facial recognition system.

A non-transitory processor readable medium containing a set of instructions thereon is provided. The instructions, when executed by the processor cause the processor to capture, at an edge device, an image, the image including at least one face of a person, the image captured at a first resolution. The instructions on the medium further cause the processor to store the image at the first resolution in the edge device. The instructions on the medium further cause the processor to convert the image to a second resolution, the second resolution being lower than the first resolution. The instructions on the medium further cause the processor to send the converted image to a backend facial recognition system. The instructions on the medium further cause the processor to receive a set of candidate facial recognition matches. The instructions on the medium further cause the processor to perform, at the edge device, facial recognition based on the stored image captured at the first resolution and the set of candidate facial recognition matches.

In one aspect, the instructions on the medium further cause the processor to detect an amount of bandwidth available on an uplink between the edge device and the backend facial recognition system and select the second resolution based on the available uplink bandwidth. In one aspect, the instructions on the medium further cause the processor to detect an amount of bandwidth available on a downlink between the backend facial recognition system and the edge device and select the second resolution based on the available downlink bandwidth.

In one aspect, the instructions on the medium further cause the processor to detect an amount of bandwidth available on an uplink between the edge device and the backend facial recognition system, detect the amount of bandwidth on a downlink between the backend facial recognition system and the edge device, and select the second resolution based on the available uplink and downlink bandwidth. In one aspect, the image is at least one frame of a video. In one aspect, the set of candidate facial recognition matches is a set of facial templates.

Further advantages and features consistent with this disclosure will be set forth in the following detailed description, with reference to the figures.

FIG. 1 is an example environment in which downlink bandwidth may be leveraged when uplink bandwidth is limited may be utilized. Environment 100 may include an edge device 110, a backend facial recognition system 130, a face database 135, a wired network 140, and a radio access network 150.

The edge device 110 may be any type of device that includes a Radio Frequency (RF) system 112 for communication with the radio access network 150. Some examples of edge devices could include smartphones, portable radios (e.g. walkie talkies, etc.), body worn cameras, hand held standalone cameras (e.g. sports cameras), etc.

In addition to being able to wirelessly connect to the radio access network 150, the edge devices may also include facial recognition capabilities 114. Facial recognition capabilities mean that the edge device is capable of capturing images or video of a scene in order to perform facial recognition on any faces within that scene. For purposes of ease of description, the remainder of this description will refer to both images (e.g. still images) and video as images. It should be understood that this is for ease of description only and is not intended to imply that the techniques are not usable with video images.

The facial recognition 114 capabilities will also include the ability to process an image of a face and compare it to a set of faces stored in a candidate faces database 116 to detect a match. The techniques described herein are not dependent on any particular type of facial recognition algorithm or technique. Any currently available or later developed facial recognition technique is usable with the techniques described herein.

The edge device 110 may also include a candidate faces database 116. As will be explained in further detail below, candidate faces database 116 may be used to store a list of candidate faces received from the backend facial recognition system. It should be understood that faces stored in the database need not be actual images of faces, but rather could be a representative value. In many facial recognition systems, the actual image of a face is not stored. Instead, an algorithm is performed on the facial image and results in a template value.

For example, in some facial recognition systems facial features are extracted (e.g. distance between eyes, distance between eyes and nose, width of lips, etc.) to create a facial features vector, and it is this vector (e.g. template) that is stored. When conducting matches in the future, an image is processed using the same algorithm, and the generated template is compared against the stored templates to determine a match. Use of a template allows for less data to be stored and additionally allows for greater privacy, as the facial images themselves are not stored. What should be understood is that candidate faces database 116 is used to store faces in whatever format (e.g. facial image, template, feature vector, etc.) that is used by the facial recognition system 114.

System 100 may also include backend facial recognition system 130. The backend facial recognition system 130 may be coupled to face database 135. Backend facial recognition system 130 may receive an image from wired network 140 or radio access network 150 and may process the image to detect faces in the image. Those faces may then be compared to faces stored in face database 135. Face database 135 may be a large database including all people that backend facial recognition system 130 can recognize. For example, in the case of several commercially available facial recognition systems, the face database may include millions of identified faces.

As above, the particular facial recognition technique that is used is generally unimportant. What should be understood is that the lower the resolution of the input image, the more difficult it will be for the backend facial recognition system 130 to identify a single match. Instead, the backend facial recognition system 130 may only be able to determine a set of candidate face matches.

It should further be understood that there is no particular architecture required for backend facial recognition system 130. In some implementations it may be a single privately owned computing system. In other cases, it may be a privately owned system implemented in a public compute cloud. In yet other implementations, it may be a service offered by a public entity, such as a cloud provider. Regardless of how implemented, backend facial recognition system 130 may receive an image, perform facial recognition on that image to identify candidate face matches in the face database 135, and then send that set of candidates to the edge device.

Environment 100 may include radio access network 150. Radio access network 150 may allow edge device 110 to connect wirelessly to the radio access network. Some examples of radio access networks technology include a P25 network, a Bluetooth network, a Wi-Fi network perhaps operating in accordance with an IEEE 802.11 standard (e.g., 802.11a, 802.11b, 802.11g), an LTE network, a WiMAX transceiver perhaps operating in accordance with an IEEE 802.16 standard, and/or another similar type of wireless network.

The particular form of the radio access network 150 is unimportant. Any radio access network 150 that provides an uplink 152 that allows for data to be sent between the edge device 110 and the radio access network 150, and a downlink 154 that allows for data to be sent from the radio access network 150 to the edge device 110 would be suitable.

Environment 100 may also include (optionally) a wired network 140. For example, the wired network 140 may be the Internet. In many cases, radio access network 150 may be most suitable for providing the wireless link to the edge device 110, but then send the data to the end destination (e.g. the backend facial recognition system 130) via a wired network, such as the Internet. For purposes of this description, the wired network may simply be a transport medium.

In operation, the edge device 110 may capture a field of view using the camera that is included in the facial recognition system 114. The field of view may include at least one face. The image captured may be at a first resolution. As would be known to a person of skill in the art, the resolution determines how detailed the image capture is. Higher resolution images contain more detail while lower resolution images contain less detail.

The edge device 110 may then store the captured image at the original resolution. Use of the image at the original resolution is described in further detail below. The edge device 110 may then determine the amount of available bandwidth on the uplink 152. In some cases, this may involve communication with the radio access network 150 to reserve an amount of uplink bandwidth. In other cases, this may involve testing the uplink channel to see how much bandwidth is available (e.g. performing tests utilizing TCP slow start protocol). In other cases, an application on the edge device 110 may be used to determine the available uplink bandwidth. The same determination may be made for the available downlink 154 bandwidth, using the same or similar techniques. The particular techniques for determining the available uplink 152 and downlink 154 bandwidths are relatively unimportant.

The edge device 110 may then convert the image from the first resolution, to a second lower resolution based on the available uplink 152 and downlink 154 bandwidth. The selection of the second resolution is described in more detail below. The edge device 110 may then send the image at the second lower resolution over the uplink 152 to the radio access network 150. The radio access network 150 may then forward the image via the wired network 140 to the backend facial recognition system 130. The backend facial recognition system 130 may then attempt to match the image to faces stored in the face database system 135.

Because the image received by the backend facial recognition system 130 was received at the lower second resolution, the system may not be able to find a single definitive match. Instead, the backend facial recognition system 130 may identify a set of one or more candidate face matches, which match the lower resolution image. The backend facial recognition system 130 may then send this set of candidate face matches to the edge device via the wired network 140 and the radio access network 150 utilizing the downlink 154.

The edge device 110 may receive the set of candidate face matches and store them in the candidate faces database 116. The edge device may utilize the facial recognition system 114 to perform facial recognition using the image captured at the first higher resolution and comparing it to the candidate faces matches that were received. Because the comparison is done with the image at the original higher resolution, the facial recognition system 114 would have a better chance of reducing the set of candidate face matches to a single match.

Selection of the second resolution may be based on both the available uplink 152 and downlink 154 bandwidth. In a case where there are no limitations, the image at its original capture resolution may be sent. The backend facial recognition system 130 may then have a better chance at identifying a single matching face. In this case, the second resolution is selected to be the same as the first.

However, if uplink 152 bandwidth is limited, the second resolution may be modified based on the number of expected matches as well as downlink capability. For example, historical data may be used to show an approximate number of candidate face matches that would be expected given a resolution of an uploaded image. For example, if the original image is sent, there is expected to be only a single face match in the candidate set. As the second resolution is decreased (causing the amount of uplink bandwidth used decreased) the expected number of faces in the candidate set increases (causing bandwidth used on the downlink to increase).

If there is large capacity available on the downlink to send large sets of candidates, the second resolution can be selected to utilize the downlink bandwidth more efficiently. For example, assume that there is a large amount of downlink bandwidth available. The second resolution can be selected to minimize the amount of uplink bandwidth used (thus making it available for use by others) because there is sufficient downlink bandwidth available to handle the larger set of candidate face matches that will result from the use of a much lower second resolution.

On the other hand, if there is not a large amount of bandwidth available on the downlink, it may be better to select the second resolution to be as close to the original (if not the original) in order to reduce the size of the set of candidates that would need to be sent over the downlink.

In other words, the second resolution may be selected so as to try to ensure that the set of candidates does not flood the downlink bandwidth. As downlink bandwidth availability increases, the second resolution can be selected to be smaller (i.e. using less uplink bandwidth). As downlink bandwidth availability decreases, the second resolution can be selected to be higher (i.e. using more uplink bandwidth) in order to reduce the size of the set of candidate face matches, thus reducing the amount of downlink bandwidth that is consumed.

Figure 2:
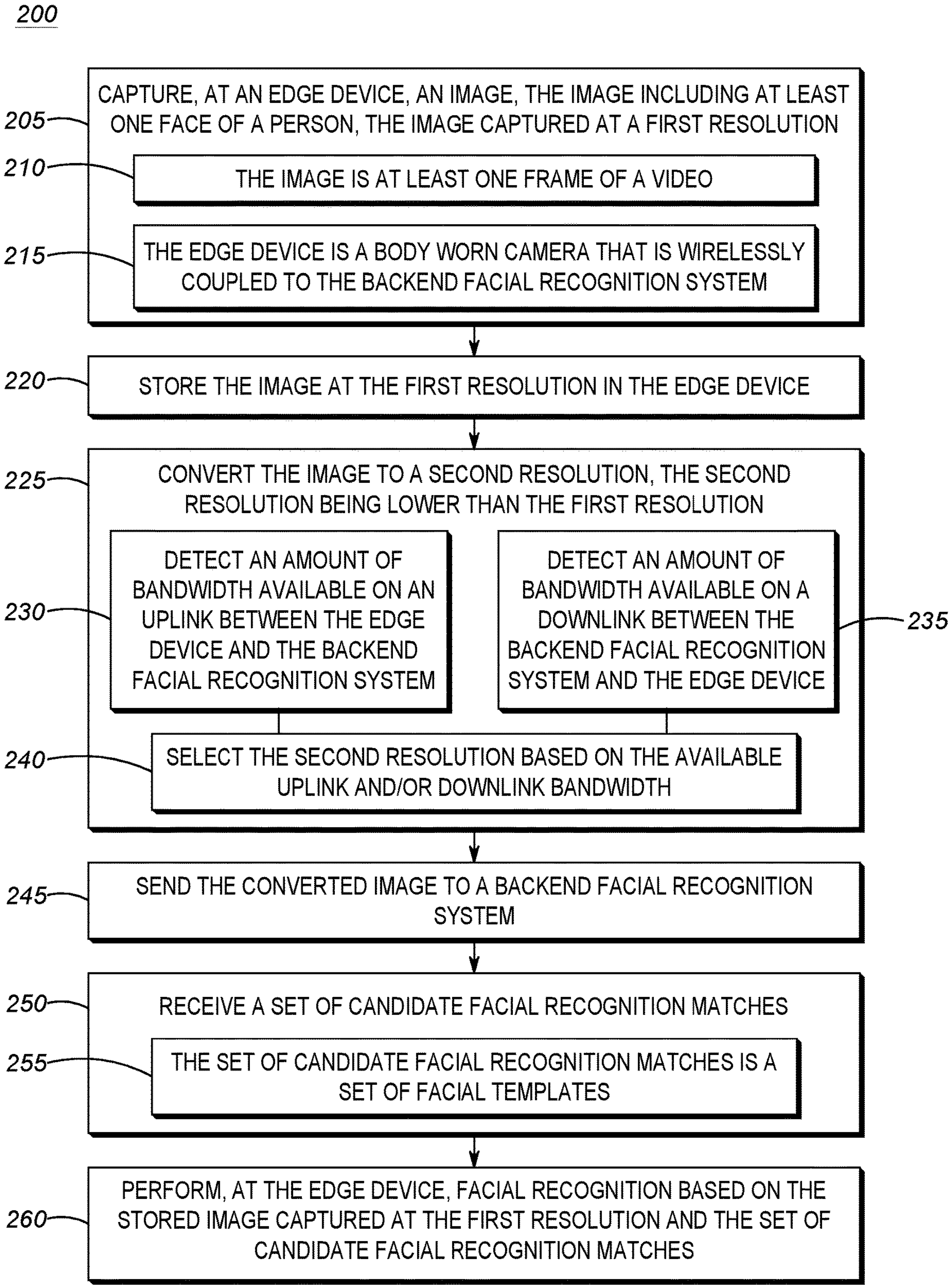
FIG. 2 is an example of a flow diagram for an implementation of leveraging downlink bandwidth when uplink bandwidth is limited, from the perspective of the edge device.

FIG. 2 is an example of a flow diagram 200 for an implementation of leveraging downlink bandwidth when uplink bandwidth is limited, from the perspective of the edge device. In block 205, an image may be captured at an edge device. The image may include at least one face of a person. The image may be captured at a first resolution. For example, the image may be a still image captured by a still camera. In other cases, the image is at least one frame of a video 210. For example, a camera may include the capability of capturing video. This video may include one or more faces in the video.

As a specific example, the edge device may be a body worn camera that is wirelessly coupled to the backend facial recognition system 215. For example, the body worn camera may be coupled to a wired network via the radio access network (RAN), as depicted in FIG. 1. The backend facial recognition system may then be coupled to the wired network, allowing for wireless communication between the edge device (e.g. body worn camera, etc.) and the backend facial recognition system.

In block 220, the image may be stored at the first resolution in the edge device. As will become clear below, the originally captured image, which will be at a higher resolution will be used later in the facial recognition process. Storing the originally captured image on the edge device ensures that the highest available resolution image remains available to be processed.

In block 225, the image may be converted to a second resolution, the second resolution being lower than the first resolution. As explained above, the techniques described herein make use of the asymmetry in available uplink/downlink bandwidth to more efficiently transfer the image to the backend facial recognition system. By selecting a lower resolution to send the image to the backend system, this results in less usage of the uplink bandwidth. However, this comes at the price of greater usage of the downlink bandwidth.

The specific selection of the second, lower resolution can be based on several factors. In block 230, an amount of bandwidth available on an uplink between the edge device and the backend facial recognition system may be detected. As explained above, there are many techniques available to make such a determination. For example, some are based on direct interaction with the RAN (e.g. reserving a GBR channel, etc.), some are based on network parameters (e.g. TC slow start, etc.), some are based on application level communications between the edge device and the backend facial recognition system, etc. The techniques described herein are not dependent on the specific techniques used to detect the amount of bandwidth available on the uplink.

In block 235, an amount of bandwidth on a downlink between the backend facial recognition system and the edge device may be detected. Once again, as explained above, there are known techniques available for detecting how much downlink bandwidth is available. The techniques can include requesting guarantee of bandwidth from the RAN, protocol specific techniques (e.g. TCP slow start, etc.), and application level techniques for the application that is being used to connect the edge device and the backend facial recognition system. The techniques described herein are not dependent on the specific techniques used to detect the amount of bandwidth available on the uplink.

In block 240, the second resolution may be selected based on the available uplink and/or downlink bandwidth. As explained above, the selection of the second resolution involves tradeoffs. If the selected second resolution is too high, this results in excessive usage of the available uplink bandwidth, which may result in less uplink bandwidth available for all users in aggregate. However, this comes with the benefit that the set of candidate facial recognition matches may be smaller, resulting in less use of the downlink bandwidth. But it also comes with the downside that there may be available downlink bandwidth that could have been used to send a larger set of candidates.

Likewise, if the second resolution that is selected is too low, this results in less use of the uplink bandwidth. However, the set of candidate facial recognition matches would be higher because it would be more difficult for the backend facial recognition system to eliminate candidates when a lower resolution input image is used. This in turn results in excess usage of the downlink bandwidth to send the larger candidate set.

Although each of the uplink and downlink available bandwidth could be used independently to select the second resolution, in some implementations, both may be used together to improve the usage of available bandwidth. For example, the system could learn that at a certain second resolution, the candidate set of matches will generally consist of a certain number of candidates, which in turn will require a certain amount of bandwidth to transmit to the edge device. By taking both the available uplink and downlink available bandwidth into consideration, a more optimized use of both uplink and downlink bandwidth can be achieved.

In block 245, the converted image may be sent to the backend facial recognition system. In other words, the image at the second lower resolution may be sent to the backend facial recognition system to determine the candidate set of facial recognition matches.

In block 250, a set of candidate facial recognition matches may be received. The set of candidate facial recognition matches may be received from the backend facial recognition system. As explained above, because a lower resolution image is used, it might not be possible for the backend facial recognition system to identify a single match with a high enough level of confidence to indicate that it is a match. Instead, the candidate set may be a set of matches that have reached a sufficiently high confidence level, but not high enough to eliminate all others. As should be clear, the lower the selected second resolution, the larger number of candidates that should be expected to be included in the set.

In block 255, the set of candidate facial recognition matches is a set of facial templates. In many facial recognition systems, the actual image of a face is not stored. Instead, an algorithm is performed on the facial image and results in a template value. For example, in some facial recognition systems facial features are extracted (e.g. distance between eyes, distance between eyes and nose, width of lips, etc.) to create a facial features vector, and it is this vector (e.g. template) that is stored. When conducting matches in the future, an image is processed using the same algorithm, and the generated template is compared against the stored templates to determine a match. Use of a template allows for less data to be stored and additionally allows for greater privacy, as the facial images themselves are not stored.

In block 260 facial recognition may be performed at the edge device based on the stored image captured at the first resolution and the set of candidate facial recognition matches. Because the first, higher resolution image is being used for the facial recognition match, the facial recognition algorithm should be better able to determine if the facial image matches with a sufficiently high level of confidence. In addition, because the set of candidate matches has been initially reduced by the backend facial recognition system, the amount of processing power/database storage at the edge device is reduced, because the edge device is not attempting to perform facial recognition using a high resolution image on a large database of facial images that require comparison. The candidate set has already been reduced to the most likely matches.

It should be noted in block 250, the set of candidate facial recognition matches could include only a single face (e.g. the lower second resolution was sufficiently high for the facial recognition system to identify a match). In addition, the candidate set could also come back as an empty set, meaning the facial recognition system was unable to identify a match with a sufficiently high level of confidence to be included in the candidate set based on the image at the second resolution. In such cases, the process may be repeated, with the second resolution selected to be a higher resolution than during the previous iteration. This process may be repeated until the image is sent at the first resolution. If there are still no entries in the candidate set at that point, the facial recognition process cannot be performed on the image.

Figure 3:
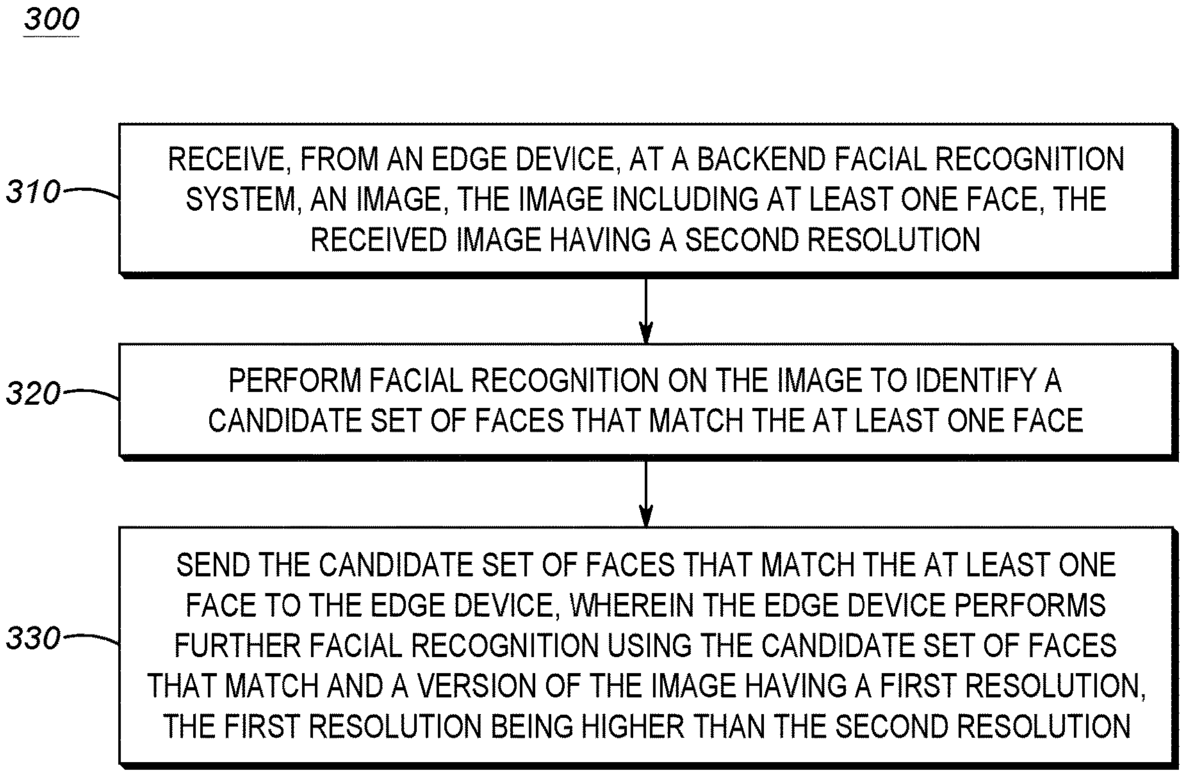
FIG. 3 is an example of a flow diagram for an implementation of leveraging downlink bandwidth when uplink bandwidth is limited, from the perspective of the backend system.

FIG. 3 is an example of a flow diagram 300 for an implementation of leveraging downlink bandwidth when uplink bandwidth is limited, from the perspective of the backend system. In block 310, a backend facial recognition system may receive, from an edge device, an image that includes at least one face. The image may have a second resolution. As described above, the backend facial recognition system may receive the image at a lower resolution than which it is captured. However, it is not necessary for the backend facial recognition system to know that it has not received the image at the original resolution.

In block 320, facial recognition may be performed on the image to identify a candidate set of faces that match the at least one face. As described above, because the facial recognition system is not dealing with the highest available resolution input image, it may not be able to identify, with a high enough degree of certainty, that a face in the received image matches a particular face with high confidence. Instead, the facial recognition system generates a set of faces that could potentially match, albeit with a reduced confidence level.

It should be noted that the set of images could also include only a single image. If the facial recognition system is able to determine, with a sufficiently high level of confidence, that the image at the lower second resolution matches only a single face, the resultant set may include only that face. Furthermore, it is possible that the facial recognition system is not able to identify any faces with sufficient confidence for inclusion in the set. As such, the set of candidate faces may be empty.

In block 330, the candidate set of faces that match the at least one face may be sent to the edge device. The edge device may perform further facial recognition using the candidate set of faces that match and a version of the image having a first resolution, the first resolution being higher than the second resolution.

Figure 4:
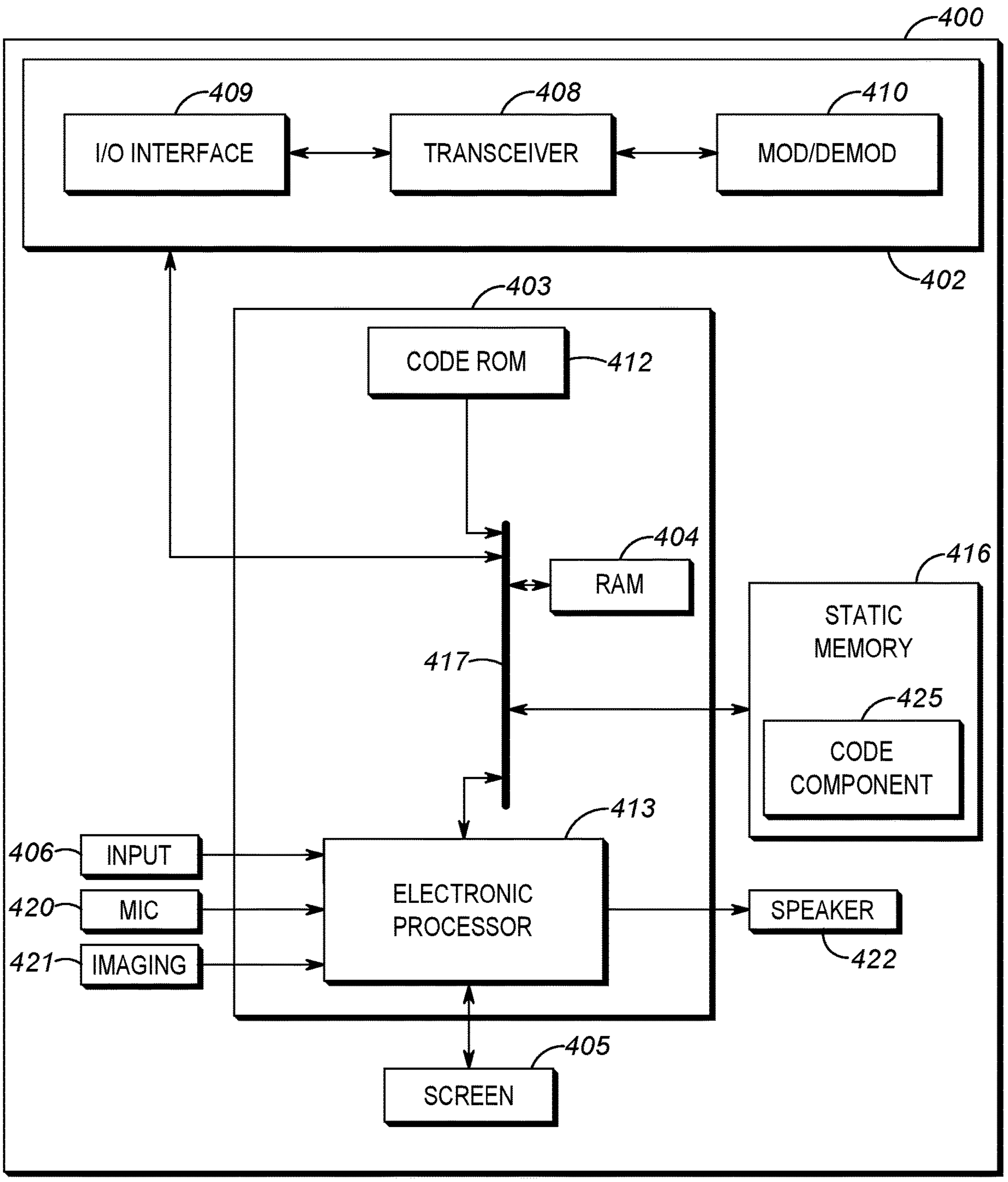
FIG. 4 is an example of a device that may implement an edge device.

FIG. 4 is an example of a device 400 that may implement an edge device usable with the techniques described herein. The edge device 400 may be, for example, the edge device 110 described in FIG. 1 and/or may be a distributed edge device across two or more of the foregoing (or multiple of a same type of one of the foregoing) and linked via a wired and/or wireless edge link(s). In some embodiments, the edge device 400 (for example, edge device 110) may be communicatively coupled to other devices such as backend facial recognition system 130.

While FIG. 4 represents an edge device described above with respect to FIG. 1, depending on the type of the edge device, the edge device 400 may include fewer or additional components in configurations different from that illustrated in FIG. 4. For example, in some embodiments, edge device 400 may not include one or more of the screen 405, input device 406, microphone 420, imaging device 421, and speaker 422. As another example, in some embodiments, the edge device 400 may further include connections to external devices (not shown). Other combinations are possible as well.

As shown in FIG. 4, edge device 400 includes a communications unit 402 coupled to a common data and address bus 417 of a processing unit 403. The edge device 400 may also include one or more input devices (e.g., keypad, pointing device, touch-sensitive surface, etc.) 406 and an electronic display screen 405 (which, in some embodiments, may be a touch screen and thus also act as an input device 406), each coupled to be in communication with the processing unit 403.

The microphone 420 may be present for capturing audio from a user and/or other environmental or background audio that is further processed by processing unit 403 in accordance with the remainder of this disclosure and/or is transmitted as voice or audio stream data, or as acoustical environment indications, by communications unit 402 to other portable radios and/or other edge devices. The imaging device 421 may provide video (still or moving images) of an area in a field of view of the edge device 400 for further processing by the processing unit 403 and/or for further transmission by the communications unit 402 to the backend facial recognition system 130.

A speaker 422 may be present for reproducing audio that is decoded from voice or audio streams of calls received via the communications unit 402 from other portable radios, from digital audio stored at the edge device 400, from other ad-hoc or direct mode devices, and/or from an infrastructure RAN device, or may playback alert tones or other types of pre-recorded audio.

The processing unit 403 may include a code Read Only Memory (ROM) 412 coupled to the common data and address bus 417 for storing data for initializing system components. The processing unit 403 may further include an electronic processor 413 (for example, a microprocessor or another electronic device) coupled, by the common data and address bus 417, to a Random Access Memory (RAM) 404 and a static memory 416.

The communications unit 402 may include one or more wired and/or wireless input/output (I/O) interfaces 409 that are configurable to communicate with other devices, such as the RAN 150.

For example, the communications unit 402 may include one or more wireless transceivers 408, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The electronic processor 413 has ports for coupling to the display screen 405, the input device 406, the microphone 420, the imaging device 421, and/or the speaker 422. Static memory 416 may store operating code 425 for the electronic processor 413 that, when executed, performs one or more of the steps set forth in FIGS. 1-2 and accompanying text.

For example, the static memory may contain code that causes the conversion of images captured at a higher resolution to be stored and then converted to a lower resolution. The static memory may also include code that causes the lower resolution image to be sent to the backend facial recognition system 130 via the RAN 150. The static memory may also include code to store a set of candidate face matches to a local database, such as candidate faces database 116. The static memory may also include code to perform facial recognition on the stored higher resolution image and compare to faces stored in the candidate faces database 116.

In some embodiments, static memory 416 may store, permanently or temporarily, instructions to implement the functionality described above. For example, static memory 416 may include instructions that generally correspond to instructions that cause the processor to implement the functionality described in FIG. 1 and blocks 205-260 of FIG. 2.

The static memory 416 may comprise, for example, a hard-disk drive (HDD), an optical disk drive such as a compact disk (CD) drive or digital versatile disk (DVD) drive, a solid state drive (SSD), a flash memory drive, or a tape drive, and the like.

Figure 5:
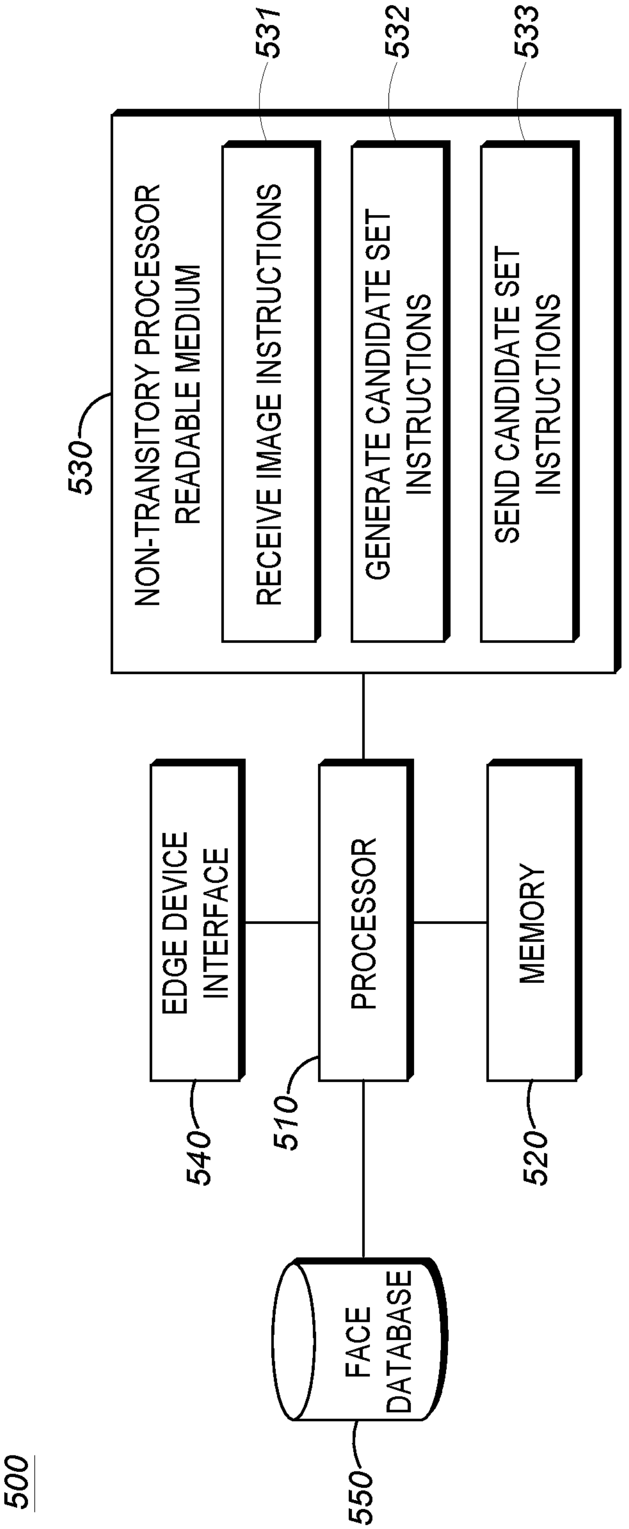
FIG. 5 is an example of a device that may implement a backend system.

FIG. 5 is an example of a device 500 that may implement a backend system. It should be understood that FIG. 5 represents one example implementation of a computing device that utilizes the techniques described herein. Although only a single processor is shown, it would be readily understood that a person of skill in the art would recognize that distributed implementations are also possible.

For example, the various pieces of functionality described above (e.g. facial recognition, candidate set generation, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, edge device interface 540, and face database 550.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include receive image instructions 531. The receive image instructions 531 may cause the processor to receive an image from an edge device. For example, the image may be received using edge device interface 540. Edge device interface could be an interface to a wired and/or wireless network. What should be understood is that edge device interface allows for communication with an edge device that may send an image, the image including a face. The receive image instructions 531 are described throughout this description generally, including places such as the description of block 310.

Medium 530 may also include generate candidate set instructions 532. Generate candidate set instructions 532 may cause the process to perform a facial recognition process on the image received via the edge device interface. For example, the processor may determine potential matches with faces stored in the face database. The facial recognition process may identify candidates that meet a threshold confidence level for matching the face in the image, but the confidence level may not be high enough to declare a match. The generate candidate set instructions 532 are described throughout this description generally, including places such as the description of block 320.

Medium 530 may also include send candidate set instructions 533. The send candidate set instructions 533 may cause the processor to send the generate candidate set to the edge device. For example, the candidate set may be sent to the edge device via the edge device interface 540. The edge device may then perform its own facial recognition operation against only those faces in the candidate list, instead of all the faces stored in the face database 550. The send candidate set instructions 533 are described throughout this description generally, including places such as the description of block 330.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:

capturing, using a camera at an edge device, an image, the image including at least one face of a person, the image captured at a first resolution;

storing the image at the first resolution in the edge device;

converting the image to a second resolution, the second resolution being lower than the first resolution, wherein it is not possible to identify a single face with a high enough confidence level to declare a match from the lower resolution;

sending the converted image to a backend facial recognition system;

receiving a set of candidate facial recognition matches based on the converted image from the backend facial recognition system; and performing, at the edge device, facial recognition based on the stored image captured at the first resolution and the set of candidate facial recognition matches.

2. The method of claim 1 further comprising:

detecting an amount of bandwidth available on an uplink between the edge device and the backend facial recognition system; and selecting the second resolution based on the available uplink bandwidth.

3. The method of claim 1 further comprising:

detecting an amount of bandwidth available on a downlink between the backend facial recognition system and the edge device; and selecting the second resolution based on the available downlink bandwidth.

4. The method of claim 1 further comprising:

detecting an amount of bandwidth available on an uplink between the edge device and the backend facial recognition system;

detecting the amount of bandwidth on a downlink between the backend facial recognition system and the edge device; and selecting the second resolution based on the available uplink and downlink bandwidth.

5. The method of claim 1 wherein the image is at least one frame of a video.

6. The method of claim 1 wherein the set of candidate facial recognition matches is a set of facial templates.

7. The method of claim 1 wherein the edge device is a body worn camera that is wirelessly coupled to the backend facial recognition system.

8. A device comprising:

a processor; and a memory coupled to the processor, the memory containing a set of instructions thereon that when executed by the processor cause the processor to:

capture, using a camera at an edge device, an image, the image including at least one face of a person, the image captured at a first resolution;

store the image at the first resolution in the edge device;

convert the image to a second resolution, the second resolution being lower than the first resolution, wherein it is not possible to identify a single face with a high enough confidence level to declare a match from the lower resolution;

send the converted image to a backend facial recognition system;

receive a set of candidate facial recognition matches based on the converted image from the backend facial recognition system; and perform, at the edge device, facial recognition based on the stored image captured at the first resolution and the set of candidate facial recognition matches.

9. The device of claim 8 further comprising instructions to:

detect an amount of bandwidth available on an uplink between the edge device and the backend facial recognition system; and select the second resolution based on the available uplink bandwidth.

10. The device of claim 8 further comprising instructions to:

detect an amount of bandwidth available on a downlink between the backend facial recognition system and the edge device; and select the second resolution based on the available downlink bandwidth.

11. The device of claim 8 further comprising instructions to:

detect an amount of bandwidth available on an uplink between the edge device and the backend facial recognition system;

detect the amount of bandwidth on a downlink between the backend facial recognition system and the edge device; and select the second resolution based on the available uplink and downlink bandwidth.

12. The device of claim 8 wherein the image is at least one frame of a video.

13. The device of claim 8 wherein the set of candidate facial recognition matches is a set of facial templates.

14. The device of claim 8 wherein the edge device is a body worn camera that is wirelessly coupled to the backend facial recognition system.

15. A non-transitory processor readable medium containing a set of instructions thereon that when executed by the processor cause the processor to:

capture, using a camera at an edge device, an image, the image including at least one face of a person, the image captured at a first resolution;

store the image at the first resolution in the edge device;

convert the image to a second resolution, the second resolution being lower than the first resolution, wherein it is not possible to identify a single face with a high enough confidence level to declare a match from the lower resolution;

send the converted image to a backend facial recognition system;

receive a set of candidate facial recognition matches based on the converted image from the backend facial recognition system; and perform, at the edge device, facial recognition based on the stored image captured at the first resolution and the set of candidate facial recognition matches.

16. The medium of claim 15 further comprising instructions to:

detect an amount of bandwidth available on an uplink between the edge device and the backend facial recognition system; and select the second resolution based on the available uplink bandwidth.

17. The medium of claim 15 further comprising instructions to:

detect an amount of bandwidth available on a downlink between the backend facial recognition system and the edge device; and select the second resolution based on the available downlink bandwidth.

18. The medium of claim 15 further comprising instructions to:

detect an amount of bandwidth available on an uplink between the edge device and the backend facial recognition system;

detect the amount of bandwidth on a downlink between the backend facial recognition system and the edge device; and select the second resolution based on the available uplink and downlink bandwidth.

19. The medium of claim 15 wherein the image is at least one frame of a video.

20. The medium of claim 15 wherein the set of candidate facial recognition matches is a set of facial templates.

* * * * *